Patented Feb. 2, 1932

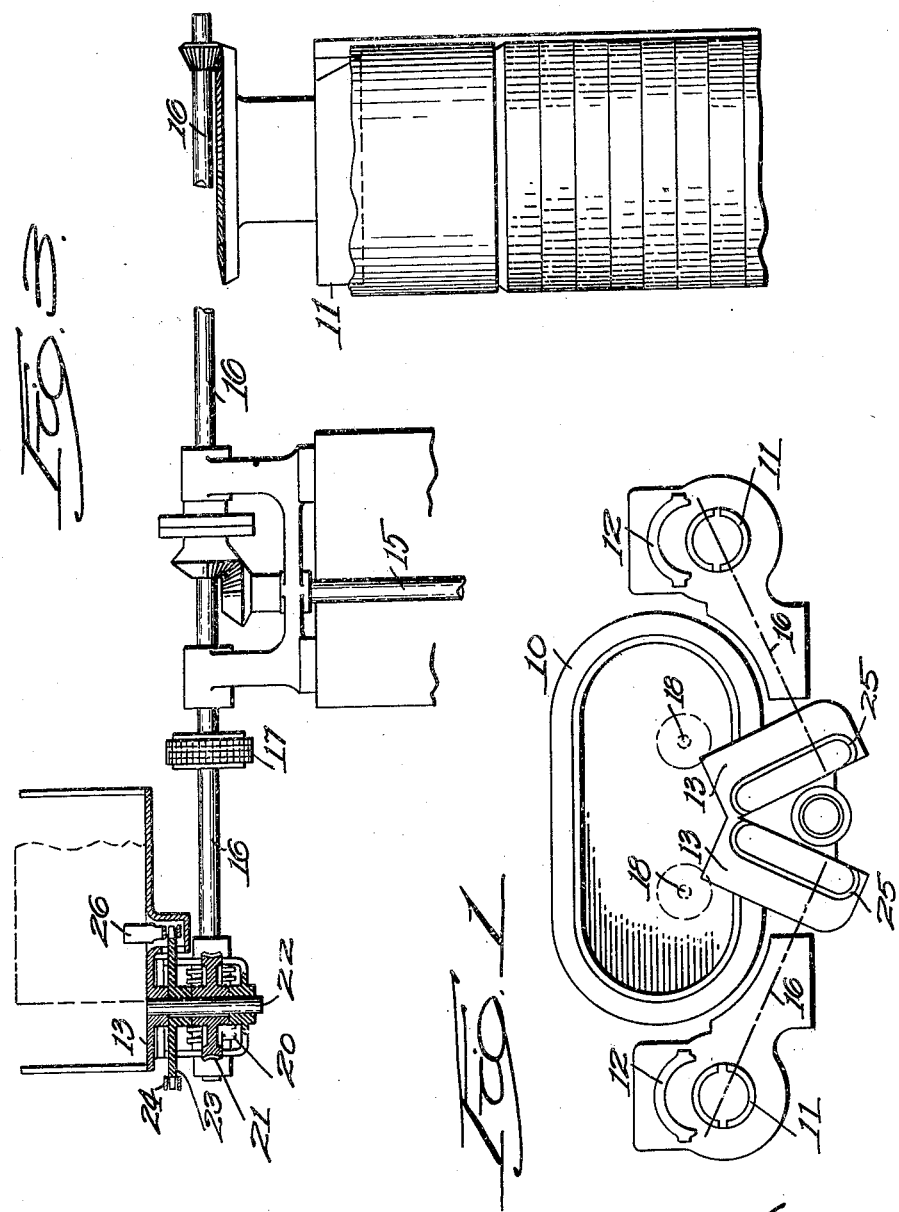

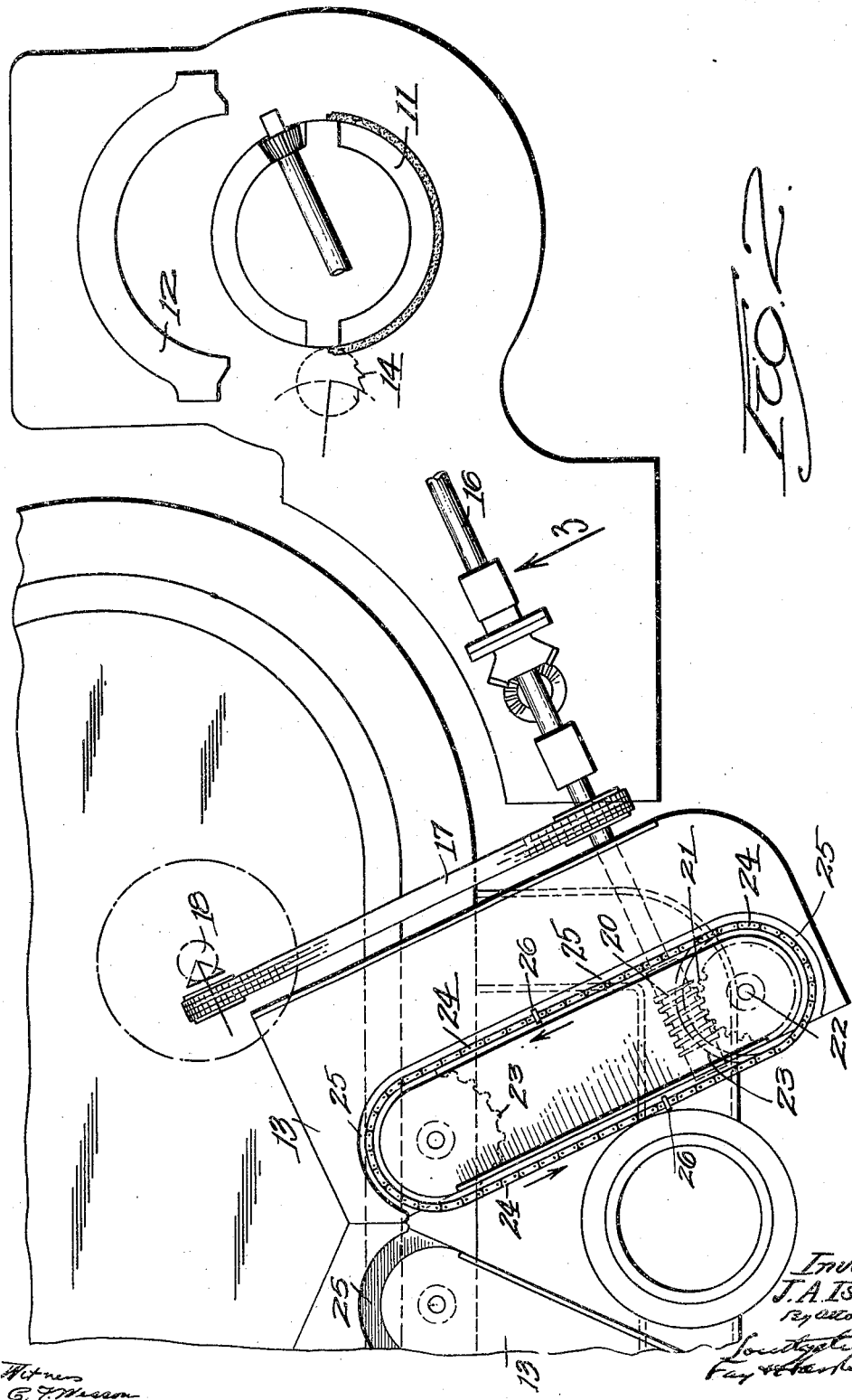

1,843,485

UNITED STATES PATENT OFFICE

JOHN A. ISBELL, OF PLAINFIELD, NEW JERSEY, ASSIGNOR TO WOOD NEWSPAPER MACHINERY CORPORATION, OF NEW YORK, N. Y., A CORPORATION OF VIRGINIA

POWER-OPERATED TAIL FEEDING DEVICE

Application filed February 24, 1927, Serial No. 170,459. Renewed June 17, 1931.

This invention relates to means for feeding the tails or risers of stereotype printing plates into the melting pot which constitutes a part of the stereotype machine. The principal object of the invention is to provide means in the chute into which the tails are discarded for feeding them along mechanically and in an orderly manner so that they will not clog the chute and require the operator to stop his work and clear out the chute.

Other objects and advantages of the invention will appear hereinafter.

Reference is to be had to the accompanying drawings in which

Fig. 1 is a plan of a melting furnace with two chutes for receiving the tails from a pair of casting machines adapted to operate with the melting furnace;

Fig. 2 is a similar plan on enlarged scale of one half of the device showing additional details of construction; and Fig. 3 is a side view with the operating means for the chute mechanism in section.

In operating a stereotype plant, the tails or risers which are severed from the newly cast plates have to be disposed of. Ordinarily the chute is located near the melting pot and the tails are thrown back into it and then they are pushed off by hand so as to drop into the melting pot. It happens frequently that a number of tails accumulate in the chute and clog the same so that the operator has to stop his work and move the tails along in the chute and push a number of them out of it into the melting pot. This invention relates to mechanical means for keeping the chute free from an accumulation of tails.

In the drawings I have shown the invention as applied to a type of stereotype casting machine comprising a double melting pot 10 and two rotary cores 11 at opposite ends of the pot cooperating with reciprocating backs 12. I have not shown the pumping arrangement or the other features of the casting devices in detail, but the tails which are severed by saws 14 are thrown into a pair of chutes 13 which are so located as to permit of the pushing of the tails back into the melting pot. These chutes have horizontal bottoms as indicated, although they may be arranged at an inclination.

In the present case, each core 11 is operated from a main power shaft 15 which, through bevel gears, turns a horizontal shaft 16 which, through bevel gear and pinion, turns the core 11. This shaft 16 is employed in the present case to drive, by means of a chain or belt 17, the pump 18. It is also provided with a worm 20 driving a worm gear 21 on a shaft 22 arranged vertically in the bottom of the chute 13. This shaft has a gear 23 which drives a chain 24 guided over another gear 23 on another vertical shaft. These parts are under the bottom of the chute 13. This chute, however, is provided with a slot 25 in the bottom and through this slot project a series of fingers 26 attached to the chain.

It will be seen that one side of the chain is located to pass along the bottom of the chute practically at the center thereof, and moves in the direction of the arrows in Fig. 2 toward the melting pot. The other strand of the chain is outside the chute. Therefore as these fingers 26 move at an even and uniform speed, any tails or risers which may be put in front of them in the chute are moved along far enough so that they fall over the edge of the bottom of the chute into the melting pot. This arrangement of course is the same on the other side in a double machine like that shown in Fig. 1, but the invention is not limited to a double machine.

By this arrangement the delivery of the tails or other pieces of metal to the melting pot is continuous if there is a supply and automatic, and the operator has to pay no attention to it in the ordinary running of the machine. His attention is therefore free at all times to do the work of running the machine. This is important particularly in cases involving the use of a plurality of casting machines with one melting pot such as that shown in the drawings.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. In a stereotype plate casting machine, the combination with a saw adapted to cut the tail from a plate and a shaft, of a melting pot and pump, means operated by said shaft for operating the pump, a chute for receiving the tails cut by said saw, a conveyor in said chute for engaging the tails therein and moving them positively and uniformly into the pot, and means operated by said shaft for driving the chain conveyor.

2. In a stereotype plate casting machine, the combination with a pair of casting boxes, saws adapted to cut the tail from a plate near said boxes, and a shaft, of a melting pot and pump, means operated by said shaft for operating the pump, a chute in position for receiving the tails cut by each saw, a conveyor in said chute for positively engaging the tails therein and moving them along the bottom of the chute at a predetermined rate of speed into the pot, and means operated by said shaft for driving the chain conveyor.

3. In a stereotype plate casting machine, the combination with a pair of casting boxes, saws adapted to cut the tail from the plates, and means to saw off the tail comprising a shaft, of a chute in position for receiving the tails cut by each saw, an endless chain conveyor in said chute for engaging the tails therein cut by the two saws and moving them along the bottom of the chute in an orderly manner, and means operated by said shaft for driving the chain conveyor.

In testimony whereof I have hereunto affixed my signature.

JOHN A. ISBELL.